April 27, 1943.   W. J. WILLIAMS   2,317,574
VERTICAL ROTARY MOULDING MACHINE
Filed Aug. 20, 1942   11 Sheets-Sheet 1

W. J. Williams
Inventor
Attorney

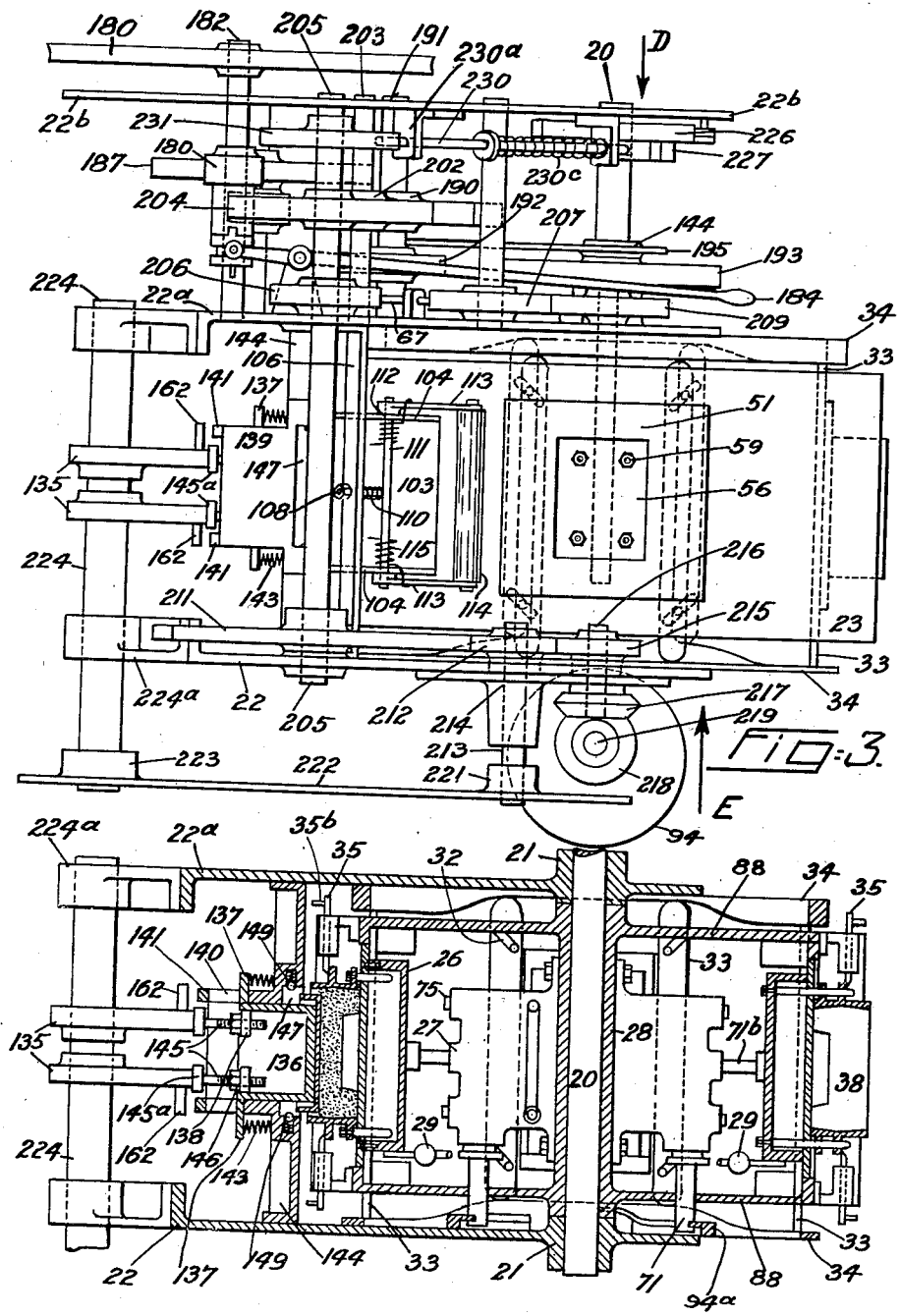

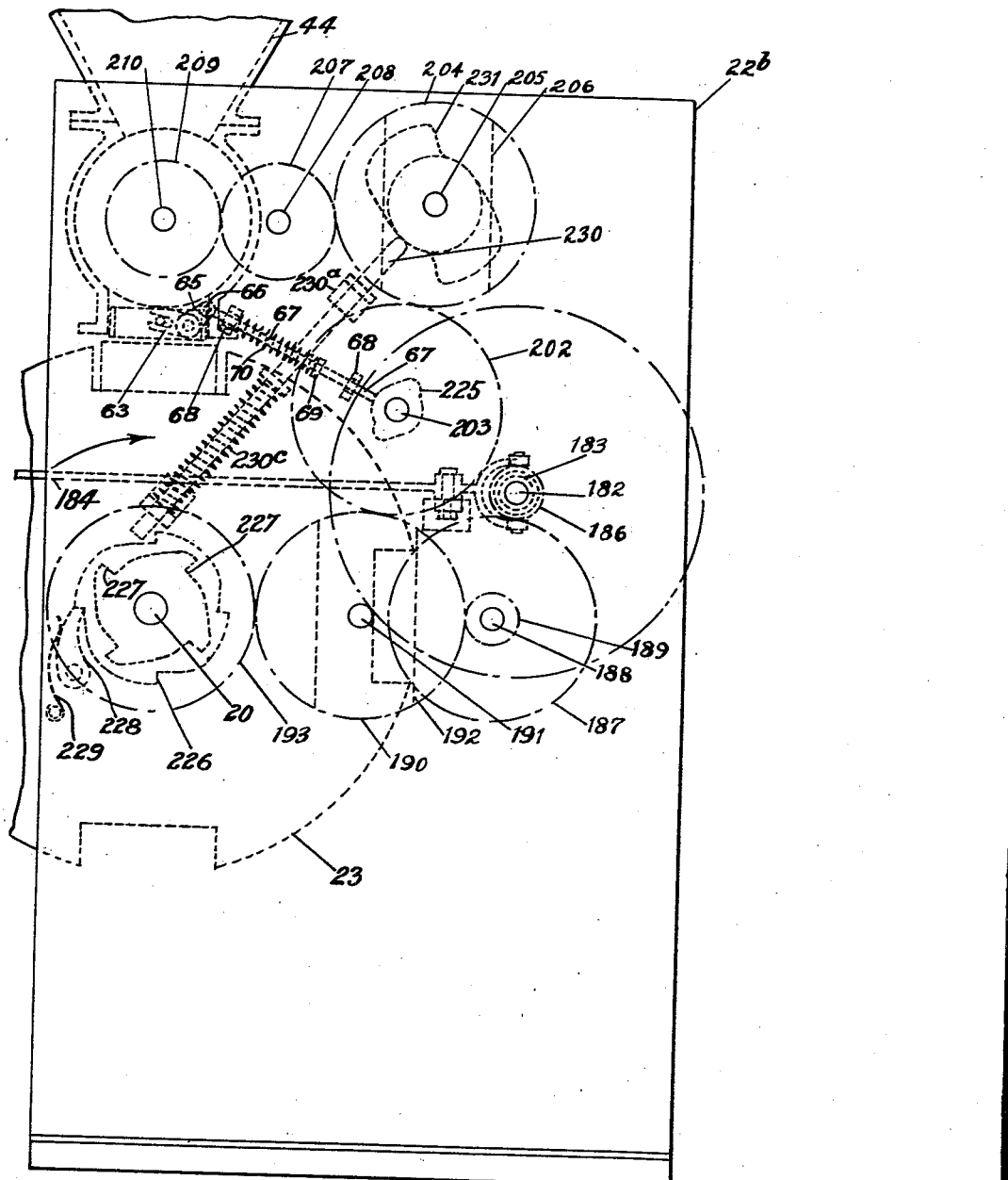

April 27, 1943.  W. J. WILLIAMS  2,317,574
VERTICAL ROTARY MOULDING MACHINE
Filed Aug. 20, 1942  11 Sheets-Sheet 6

W. J. Williams
Inventor

Attorney

April 27, 1943. W. J. WILLIAMS 2,317,574
VERTICAL ROTARY MOULDING MACHINE
Filed Aug. 20, 1942 11 Sheets-Sheet 7
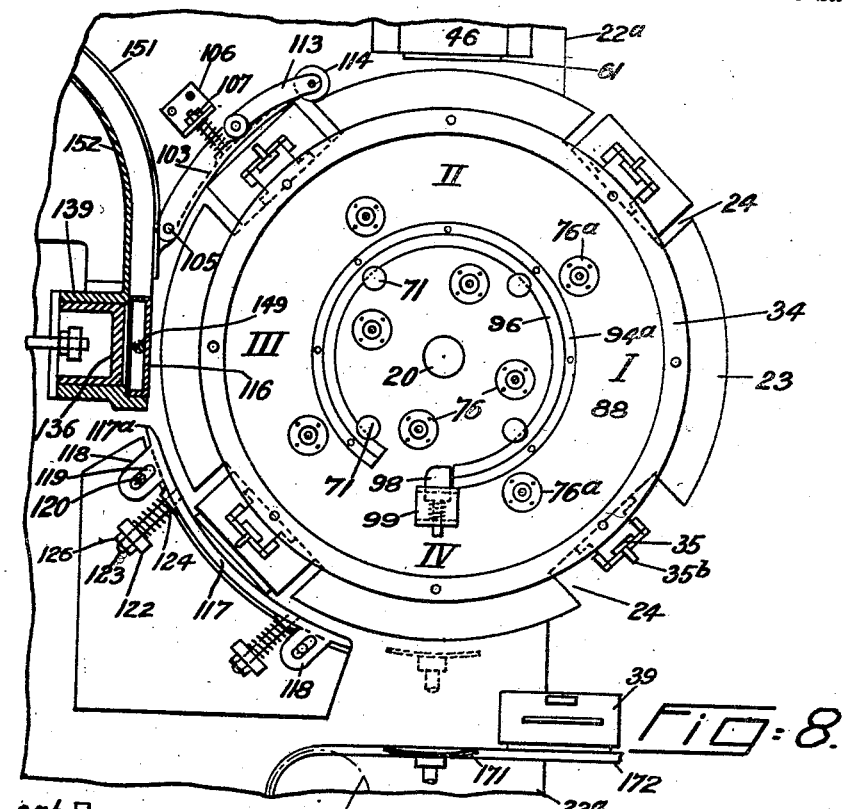
Fig. 8.
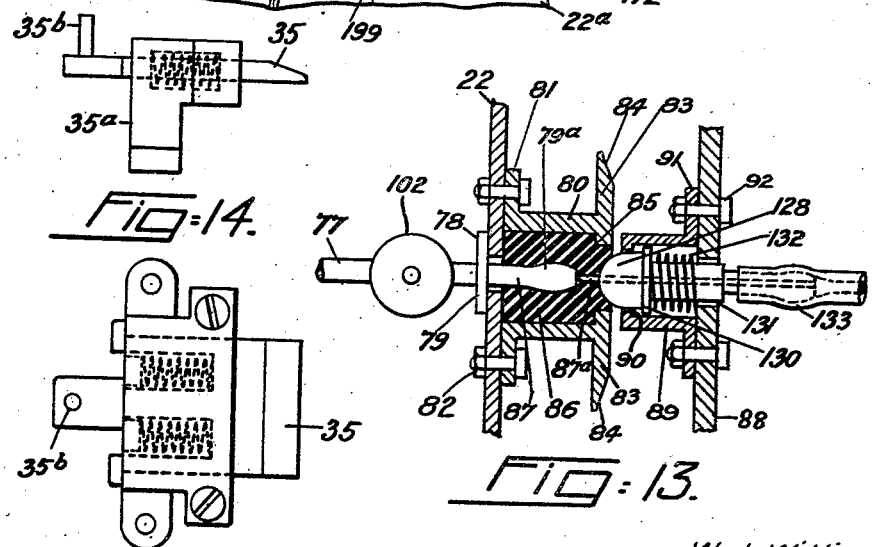
Fig. 14.
Fig. 13.
Fig. 15.
W. J. Williams
Inventor
Attorney

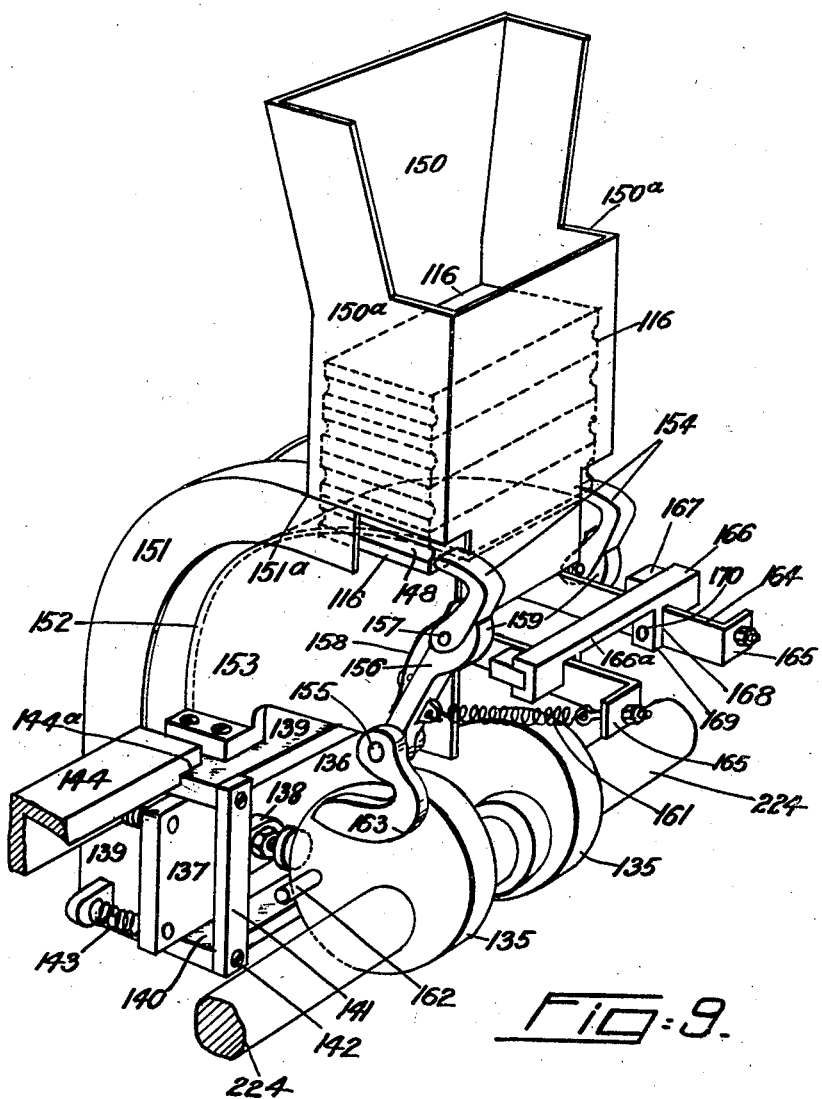

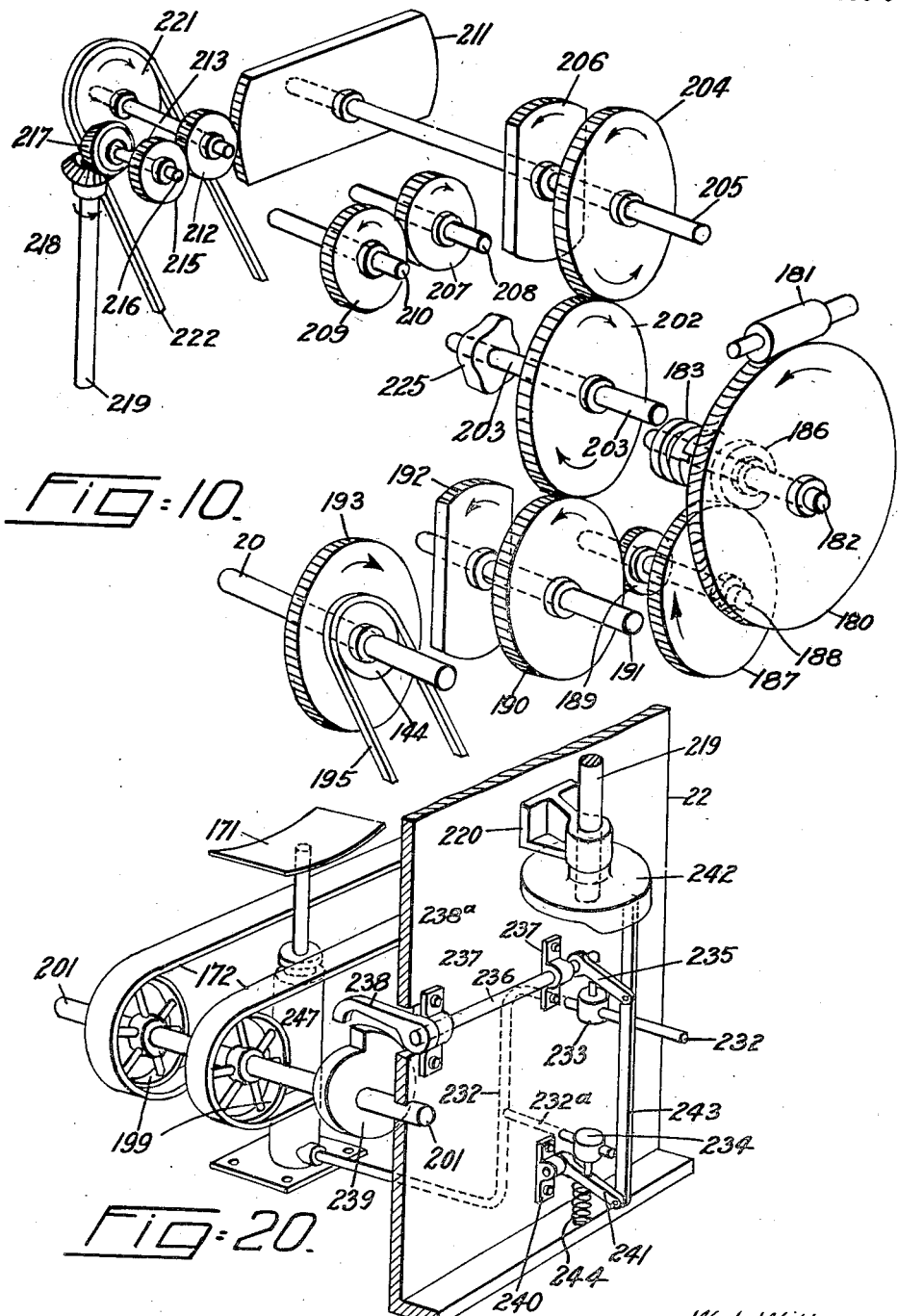

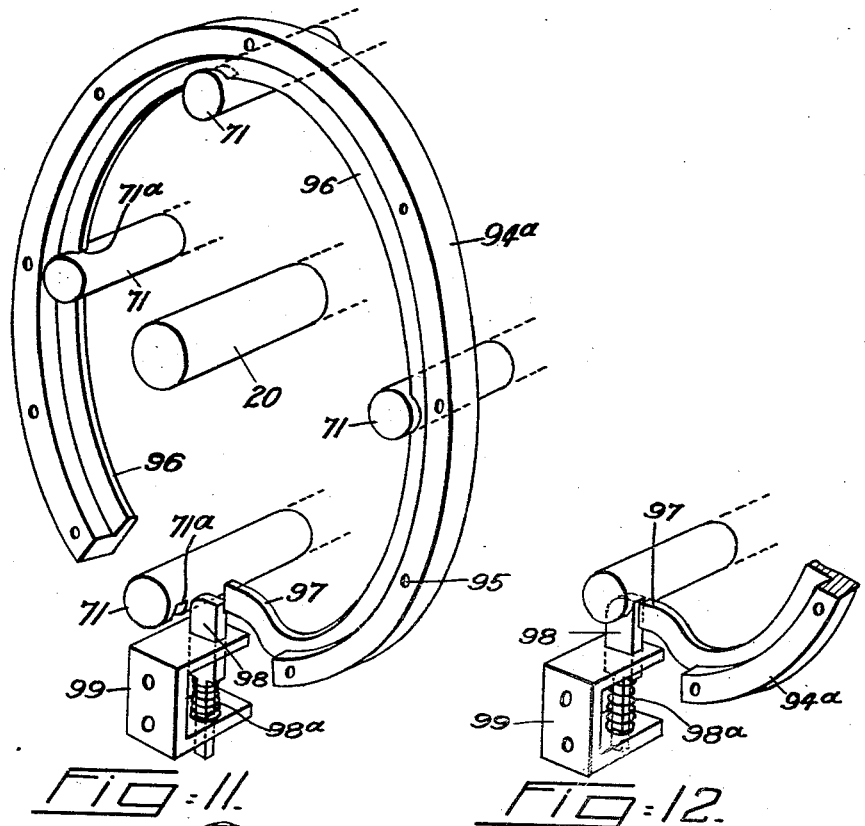
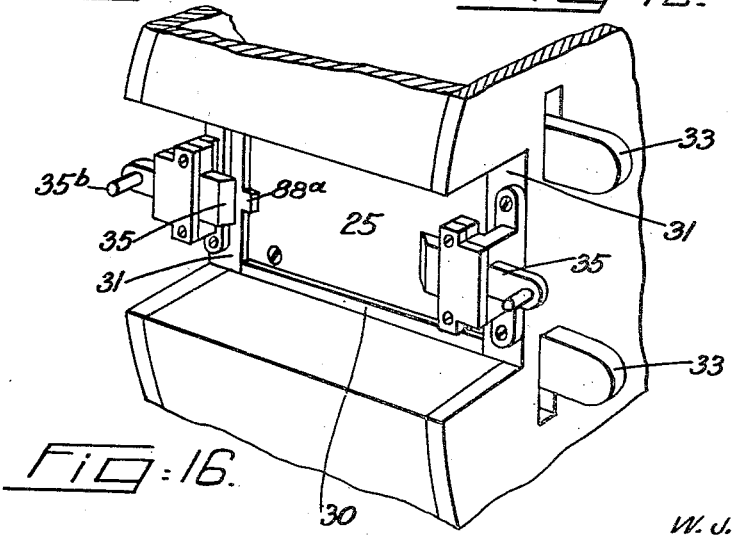

UNITED STATES PATENT OFFICE 2,317,574

VERTICAL ROTARY MOLDING MACHINE

William John Williams, Rosebery, New South Wales, Australia

Application August 20, 1942, Serial No. 455,515
In Australia April 22, 1941

5 Claims. (Cl. 22—9)

The main object of this invention is to provide a vertical rotary molding machine for forming the molds for metal castings. Other objects of the invention are to provide a machine which is capable of making either one or four half molds in each revolution and wherein the various operations of forming a half-mold are automatically and sequentially performed after each flask has been manually positioned after each pattern plate is moved into the receiving position. Another object is to provide a machine having tables whereon either single or double sided pattern plates may be removably secured and to arrange such tables upon a rotor moving through a vertical plane and controlled by timing mechanisms or devices whereby it is caused to remain stationary for a predetermined period after each quarter turn in order to allow sufficient time for (1) the flask to be manually positioned upon the rotor (2) the flask to be filled, jolted and the edges of the molding material "tucked" (3) the mold board to be positioned in the flask and pressure to be applied thereto and (4) the table to be vibrated and simultaneously raised so as to lift the pattern plate off the mold and thus enable the completed half mold, flask and mold board to be released in order that they may be deposited for removal either by manual or mechanical means as desired. It is a further object of the invention to so construct and arrange the parts of the machine that after the third flask has been manually positioned upon the rotor one of the four operations mentioned above will be taking place simultaneously at four points of the rotor and during each period that the rotor is stationary so that after the first revolution of the rotor a completed half mold will be deposited during each period of stoppage in every revolution. The function of the machine is confined to making half molds and not to the making or positioning of cores. These latter functions will be performed by any known means after the molds have been delivered from the machine.

The invention comprises a hollow rotor that is mounted horizontally in bearings carried by standards that are rigidly secured to a suitable base. The periphery of the rotor is provided with preferably four equally spaced convex surfaces interposed between each of which is a recess. Each recess is provided with a recessed lifting table to each of which a pattern plate may be rigidly and removably secured. Locking bars are provided for locking each pattern plate in position during part of each revolution of the rotor. Driving mechanism is provided and arranged so that the rotor will be caused to make intermittent arcuate movements of 90° and upon the completion of each movement to remain stationary for a predetermined period, in order to allow sufficient time for various operations, which will be explained later, to be performed at each point at which a table or frame is located. The driving gear is also arranged so that at the completion of the arcuate movements in one revolution each table or frame will have been positioned alternately in vertical and horizontal planes whilst it is stationary—twice in vertical and twice in horizontal planes. By this means after a pattern plate has been secured to each recessed table, a mold box is sequentially and manually secured within a recess in the rotor as each one of the latter is brought into position (I) at which position the table lies in a vertical plane. From this position each table is moved sequentially to the next position (II) at which the table will lie in a horizontal plane in order that the molding material may be fed into the mold box from a hopper provided for that purpose and whilst being so fed the material is "tucked" around the inner edges of the mold box by a tucking frame working in a guide and the box jolted by a jolting device of known construction in order to ensure that the material is properly packed at that stage of operations. From position (II) each table or frame and associated mold box is sequentially moved to position (III) and during its travel through that arc the outer edge of the mold box is caused to contact with a spring controlled horizontal roller for the purpose of applying preliminary pressure to the material in the mold box and thus guard against the possibility of some of the material flowing out of a box as it and its associated table or frame is being brought to the vertical position III.

As each table with its filled mold box becomes stationary at position III a mold board which has been previously removed from a hopper by a pair of specially shaped arms and caused to gravitate down guides to a position where it lies in a vertical plane immediately in alignment with and adjacent to the inner edges of the mold box (which is now positioned upon a side), is submitted to pressure applied to the outer face of the mold board by a presser head operated by a pair of cams or other suitable means for the purpose of pressing the mold board into the mold box and thereby compressing the material within the mold box. Means are provided for returning the arms to their normal position in readiness to remove the next mold board and at the completion of each compressing operation the table is moved to its next position IV. At this point the mold box has been turned completely over from the position it occupied at the position II and a rapping device of known construction and operated preferably by compressed air is caused to vibrate the table (to which the pattern plate is secured) in order to free the pattern from the molding material and simultaneously a releasing mechanism is actuated so as to release the mold box from the table and permit it to become supported by a specially arranged table which lowers it on to a pair of endless conveyor belts by which it is removed from the machine to any point where it may be subsequently dealt with as may be required for the purpose of completing the mold in readiness for the casting operations.

As the rapping device referred to lies within the hollow rotor and is actuated by compressed air, it is necessary to provide what might for convenience be called a "make and break" connection in the air supply pipe.

The hopper for the molding material is combined with a specially constructed adjustable measuring device.

Embodied with the measuring device is a housing for a tucking frame shaped and dimensioned to fit easily within the inner edge of the surrounding wall of the mold box or flask and means are provided for forcing the tucking frame downwardly for a predetermined distance into the molding material within the mold box or flask, and for raising it again to its normal position within the housing, the walls of the housing acting as guides for the movement of the tucking frame.

It is preferable if not essential that the periods between each arcuate movement of the rotor should be of equal duration and for that reason the timing gear will be arranged so that each period of stoppage will be equal to that required for the completion of that set of operations which take the longest time to complete.

These and other features of the invention will be fully explained in the detailed description which will now be given and wherein reference will be made to the accompanying drawings in which:

Figure 3 is a plan view of Figure 1 with the mold board hopper and operating mechanism removed therefrom.

Figure 4 is a horizontal sectional view taken on the line C—C of Figure 2.

Figure 5 is a side elevation viewed from the direction indicated by arrow D Figure 3.

Figure 8 is a view similar to Figure 7 but certain parts have been omitted and the rotor has been moved through a further arc of 45° in order to show the function of the preliminary compression roller and the arcuate guard plates.

Figure 9 is a perspective view of the mold board hopper and mechanism for feeding and positioning a mold board into its correct position and for ramming the sand within the mold box.

Figure 10 is a perspective diagram of the principal driving gear.

Figure 11 is a perspective view showing the fixed cam that partly controls the hydraulic ram that lifts the table and pattern plate from the mold.

Fig. 12 is a fragmentary perspective view showing portion of the fixed cam that controls the ram that lifts the table and pattern from the mold and showing a plunger rod locked during a period of stoppage.

Fig. 13 is a central sectional elevation of the make and break connections on the air supply pipes.

Fig. 14 is a side elevation of the spring controlled catch that holds the mold box in the recesses.

Fig. 15 is a plan view of Fig. 14.

Fig. 16 is a fragmentary perspective view of a portion of the rotor and showing one of the four recesses therein, the pattern plate in position at the bottom of the recess, the projecting ends of the locking bars, and the catches that hold the mold box upon the pattern plate.

Fig. 20 is a perspective view showing the mechanism for controlling the air supply to the receiving table.

Figure 1:
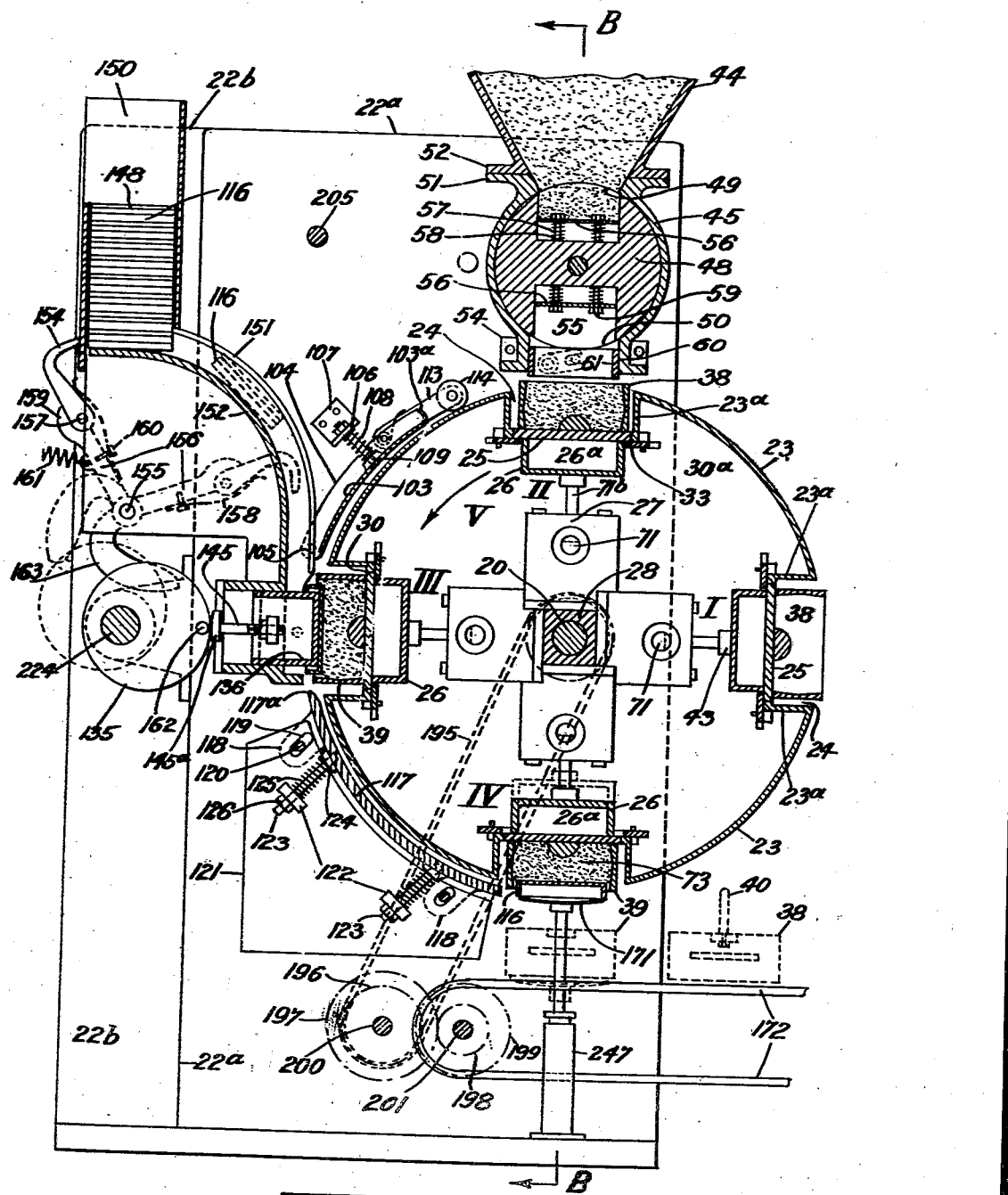
Figure 1 is a central sectional elevation, the section being taken on the line A—A of Figure 2.
Figure 2:
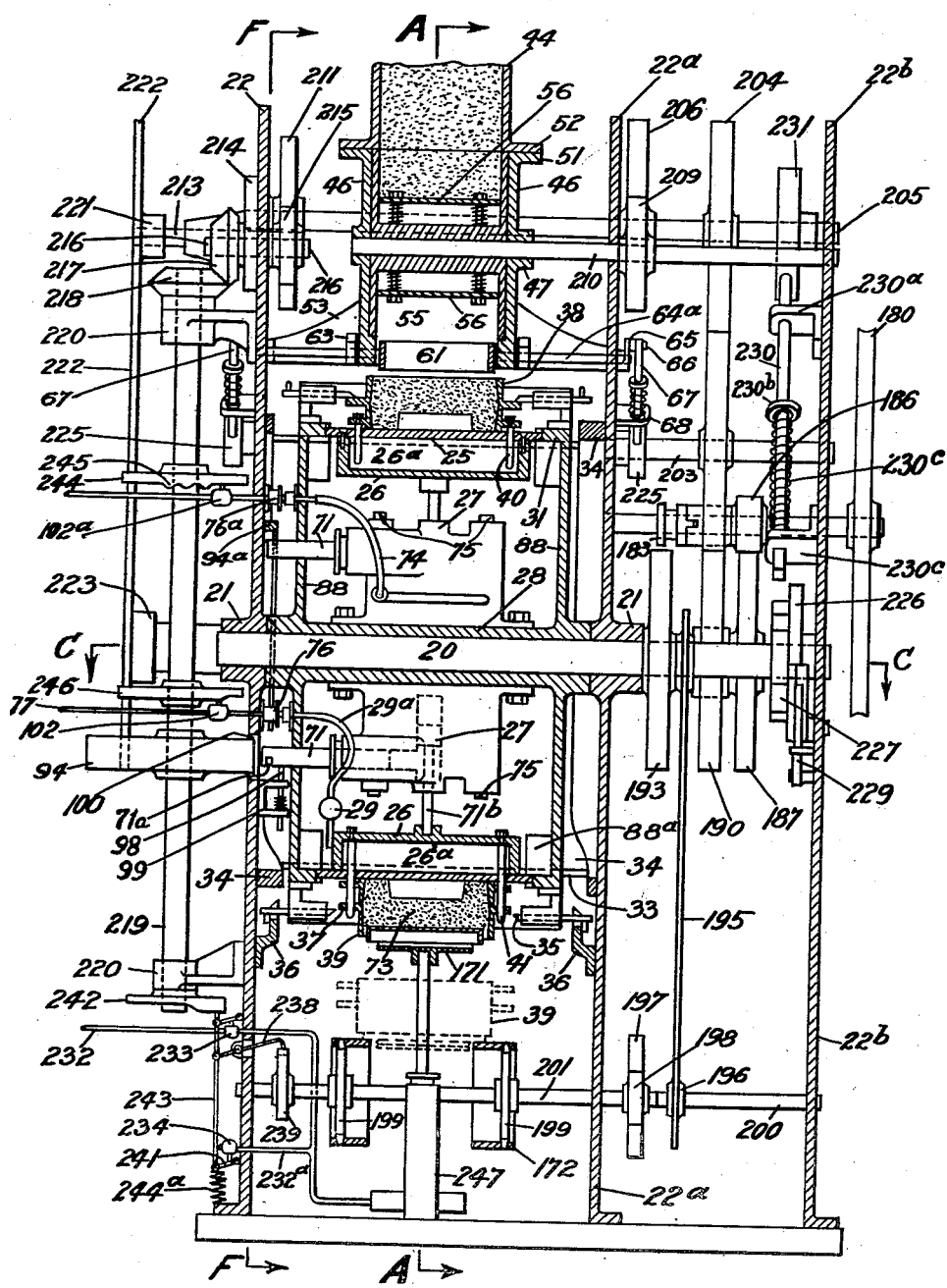
Figure 2 is a vertical section taken on the line B—B of Figure 1.
Figure 18:
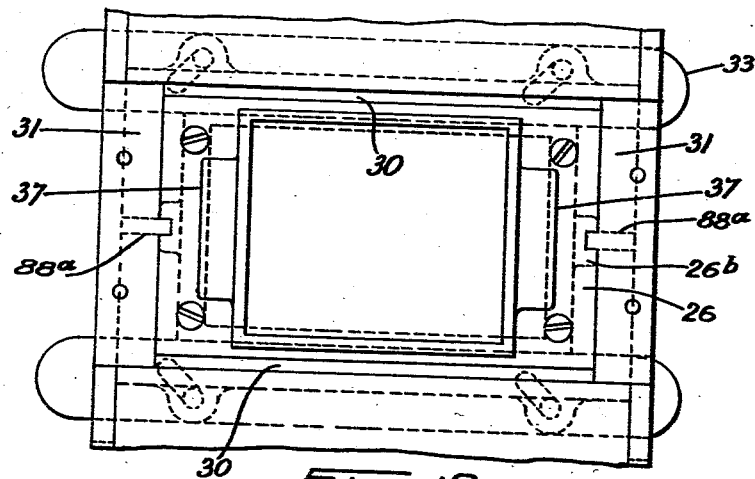
Fig. 18 is a plan view of Fig. 17.
Figure 17:
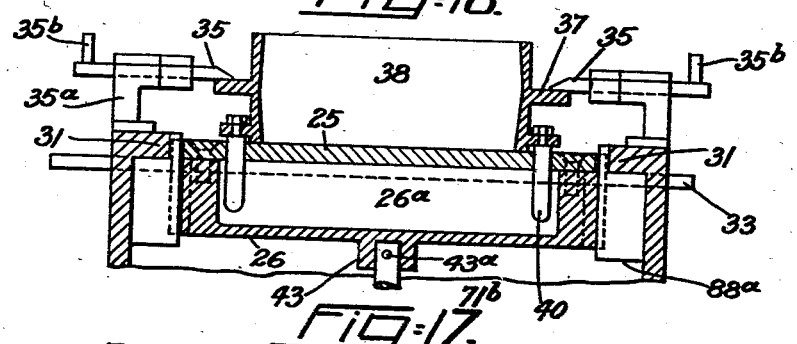
Fig. 17 is a central sectional elevation showing a portion of the rotor with mold box, pattern plate and associated lifting table with the catches holding the mold box in position.
Figure 19:
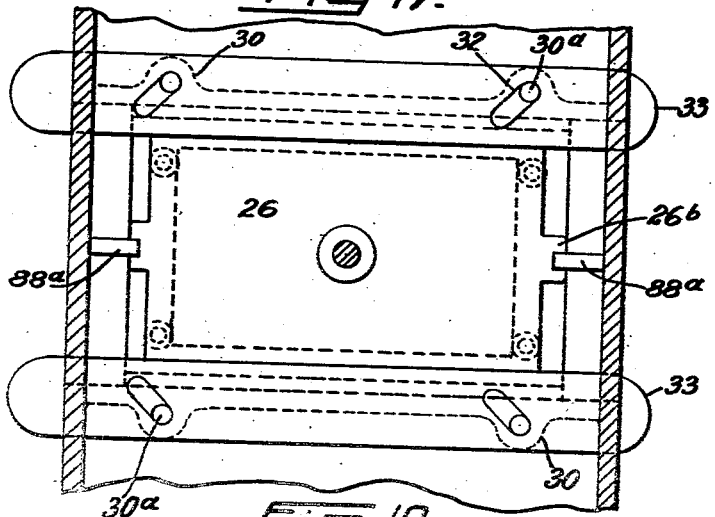
Fig. 19 is an underneath sectional plan view of Fig. 17.

At Figs. 1 and 2 of the accompanying drawings the rotor which forms an essential feature of this invention is clearly illustrated. It consists of a hollow cylindrical shaped casting that is fixed axially upon and rotated by a driven shaft 20 that is supported horizontally in bearings 21 that are carried by suitably shaped and spaced standards 22 and 22a which are secured to any suitable foundation or base. The peripheral face of the rotor is provided with preferably four plain arcuate convex surfaces 23 the ends 23a of each arcuate section being flanged or turned inwardly to form the sides of recesses 24 by which the convex surfaces are equally spaced. These recesses 24 are to receive the mold boxes and means are provided for securing cope and drag preferably, but not necessarily, in alternate recesses. The pattern plates 25 are each secured by set screws to the surround of a recessed or hollow lifting table 26 to which movement is imparted by a hydraulic ram 27. The recesses 26a in the tables 26 are to provide space to accommodate the pattern when double sided pattern plates are being used. Guides are provided to ensure the proper positioning of the pattern plate 25. For this purpose the ends of each table 26 may be provided with a recessed rib 26b and guide webs 88a (Fig. 2) are fixed to the inner face of each end of the rotor and are positioned so as to engage with the respective recesses in the ribs 26b (Fig. 18). Other means however could be employed for this purpose. Integral with the rotor is a sleeve shaft 28 through which the shaft 20 passes and is secured by a key or other suitable means. The sleeve shaft 28 is exteriorly square or otherwise suitably shaped to enable the hydraulic and pneumatic rams 27 to be bolted thereto as shown at Fig. 2. At Fig. 2 a flexible air supply pipe 29a is shown connecting one of a plurality of vibrators 29 of known construction to one of two coacting members of a make and break air connection of special construction and which will be hereinafter described. The inner edges of the flanges 23a at opposite sides of each recess 24 are turned inwardly towards one another to form narrow flanges 30 and portions of the ends of the rotor in register with the recesses are cut away from the periphery inwardly and the inner edge of the recess thus formed is turned inwardly to form flanges 31. Together the flanges 30 and 31 form a surround for and lie in the same plane with the pattern plate 25 (see Fig. 16). The flanges 30 (Fig. 1) are each provided with suitably positioned stud screws 30a (Fig. 19) which engage with the respective inclined slots 32 in a locking bar 33 which passes through suitably shaped and dimensioned holes (Figs. 16, 17, 18) at each end of the rotor, the projecting ends being rounded to enable them to be slid longitudinally and alternately in opposite directions by cams 34 (Fig. 2) which are fixed to the respective standards 22 and 22a. The angle of the slots 32 (Fig. 19) will be such that the longitudinal movement imparted by the cams 34 will cause them to slide laterally on the stud screws 30a (Figs. 18 and 19) but in opposite directions to one another and according to the direction of this lateral movement so they will be moved behind the respective sides of the pattern plate 25 (Fig. 17) at a predetermined point in the rotation of the rotor in order to form a resistance against exterior pressure on the pattern plate and clear of it at another predetermined point to permit the pattern plate to be lifted from the mold by the table 26 (Figs. 2 and 19).

Figure 7:
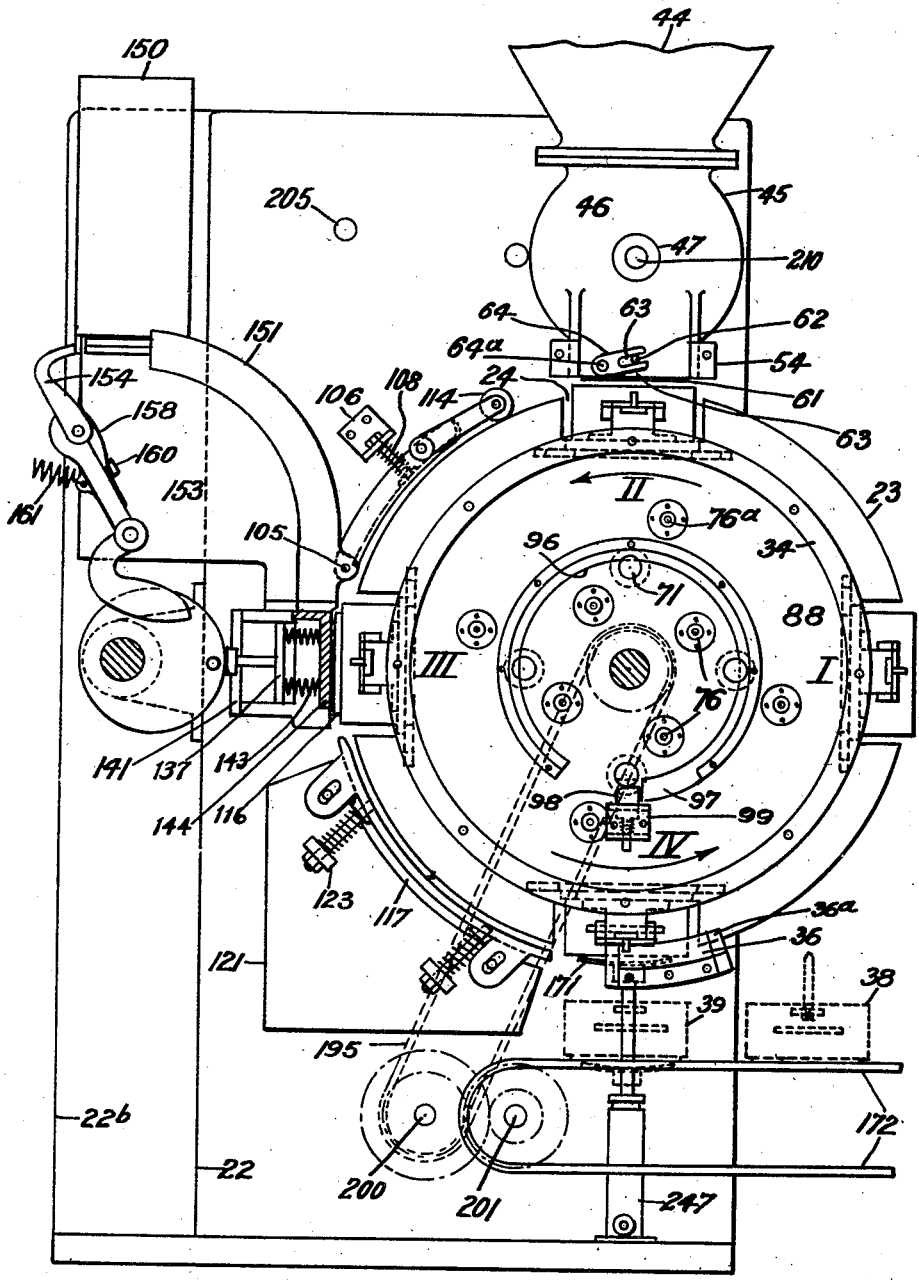
Figure 7 is a sectional elevation taken on the line F—F of Figure 2.

The flange 31 serves also as a base whereon to fix a spring controlled catch 35 (Fig. 4) which projects through both ends of its housing 35a (Fig. 17) the outer end also projecting beyond the respective ends of the rotor, the last mentioned projecting end being provided with a tooth or lug 35b which engages with a suitably inclined or longitudinally bevelled face 36a on a segmental cam 36 (see Fig. 7) one of which is fixed to the inner face of each of the standards 22 and 22a (Fig. 2). The inner end of each catch 35 (Fig. 17) is bevelled so that when a mold box is inserted in any one of the recesses 24 (Fig. 1) the bevelled edge engages with the handle 37 (Fig. 17) on the adjacent end of the mold box 38 (or 39) (Fig. 1) thus causing the catch 35 (Fig. 17) to be forced outwardly against the action of its spring until the handle has passed it when the spring controlling the catch 35 will cause the latter to move inwardly behind the handle 37 and thus maintain the mold box in position relative to the pattern plate 25. The normal and releasing positions of the catches 35 are shown clearly at Fig. 2, and at Fig. 7 is shown one of the catches released. At Fig. 2 is also seen a "cope" 39 at position IV. The pins 40 (Fig. 17) on the "drag" 38 pass through suitably positioned holes in the pattern plate 25 and extend into the recess in the table 26 but in those recesses 24 that are intended to receive "copes" 39 fixed pins 41 will be secured to the relative tables 26 and will project through holes in the pattern plate 25 and engage with the respective holes in each lug 42 at the respective ends (or sides) of a "cope."

The outer end of the plunger rod 71b (Figs. 2 and 4) of the hydraulic ram that actuates the lifting table 26 is secured in a cylindrical boss 43 (Fig. 1) formed on the bottom of the table by a pin 43a (Fig. 17) or it may be secured to the table by any other suitable means.

By referring now particularly to Fig. 1 of the drawings it will be seen that the rotor is provided with four recesses 24 and the foregoing description explains how the pattern plates 25 and mold boxes 38 and 39 are removably secured in these recesses. There are four positions, I, II, III and IV, to which each recess 24 is sequentially moved in the direction indicated by the arrow V, position I being that at which the mold boxes are manually inserted as each vacant recess is moved to its position by a quarter turn of the rotor. Position II is that at which a predetermined quantity of sand, loam or other molding material is fed into the empty mold box, the mold box jolted and the molding material tucked near the inner edge of the mold box. Position III is that at which a mold board is first fed into position in register with mold box and pressure subsequently applied thereto in order to compress the molding material within the mold box. Position IV is that at which a receiving table is moved into position immediately below the mold board, the pattern plate raised from the mold by a lifting table 26 and simultaneously rapped or vibrated and finally the mold box with the mold, and the mold board therein is lowered by the receiving table 171 (Figs. 2 and 20) on to a pair of spaced and parallel conveyor belts 172 by which it is removed to any desired location. Assuming that the four pattern plates have been secured to the tables in the respective recesses and the rotor is stationary with a recess at position I (Fig. 1) the first mold box will be manually inserted in that recess and the rotor will be turned a quarter turn and stop for a predetermined period. During this stop a second mold box will be inserted at position I whilst the first mold box will be submitted to the operations pertaining to position II when the rotor will again be moved a quarter turn. At this position whilst a third mold box is being inserted at position I the first mold box will be submitted to the operations pertaining to position III and the second mold box will be submitted to the operations pertaining to position II; the rotor will now be moved another quarter turn and stop and during this stoppage a fourth mold box will be inserted at position I whilst the third mold box is being submitted to the operations pertaining to position II, the second mold box submitted to the operations pertaining to position III and the first mold box submitted to the operations pertaining to position IV. This sequence of operations may now be continued and during each stoppage of the rotor a completed half mold will be released from position IV.

At Fig. 1 is shown a hopper 44 from which the molding material is fed into a specially constructed adjustable measuring device designed to deliver a predetermined quantity of molding material into a mold box whilst the latter is stationary at position II. The measuring device consists of a cylindrical casting 45 (Figs. 1 and 7) the ends of which are closed by substantially circular plates 46 (Fig. 2) secured in any suitable manner to the respective ends of the cylinder 45 (Fig. 1) and being provided with a central boss 47 (Fig. 2) each boss 47 having a central hole. The cylindrical casting 45 forms a housing for a measuring drum 48 which is provided with two oppositely positioned longitudinal apertures 49 and 50. The upper aperture 49 forms an inlet communicating with the hopper 44, and flanges 51 are formed along each longitudinal edge thereof to provide a seating for corresponding flanges 52 on the lower end of the hopper 44, and by which the hopper 44 may be secured to the cylinder 45. Projecting outwardly from and integral with or rigidly secured to each end plate 46 (Fig. 2) is a flanged bracket 53, the flange 54 (Fig. 1) enabling each bracket to be bolted or otherwise secured to the respective standards 22—22a (Fig. 2) and thus form supports for the hopper 44 and measuring device. The measuring drum 48 (Fig. 1) is provided with a cylindrical axial passage to form a bearing for the shaft 210 and on opposite sides thereof are recesses or chambers 55 extending from the periphery inwardly for any required distance. Each chamber 55 is provided with a false or adjustable bottom 56 for the purpose of regulating the quantity of molding material to be delivered to each mold box. For this purpose the bottom of each chamber 55 is provided with a plurality of stud screws 57 which pass through coil springs 58 and suitably positioned holes in the adjustable bottom 56, the projecting end of each stud screw being provided with a nut 59. In this manner the cubic measurement of the chamber 55 may be increased or decreased by screwing or unscrewing the nuts 59, the springs 58 maintaining the bottom 56 in contact with the nuts.

The edges of the outlet aperture 50 of the cylinder 45 are extended downwardly to form a housing 60 for a tucking frame 61, the inner vertical faces of the housing serving also as guides wherein the frame 61 may slide up and down. Opposite ends of the tucking frame 61 (Fig. 7) are provided with stud pins 62 which project through slots (not shown in drawings) formed in each of the adjacent ends of the housing and wherein the pins 62 may also move up and down. The projecting ends of the pins 62 each lie in a slot 63 formed in an end of a lever 64 which is secured to a rod 64a that is supported in bearings formed in an end-plate and a standard 22 (Fig. 2) or 22a as the case may be. Each rod 64a (Fig. 7) is provided with another lever 65 (Fig. 2) whereon is pin 66 that engages in a cylindrical hole at one end of a longitudinally slidable rod 67 that is mounted in bracket bearings 68 secured to a fixture such as the standards 22 and 22a. Each rod 67 is provided with a fixed collar 69 and a coil spring 70 ensures the return of the rod and with it the lever 64 (Fig. 7) and tucking frame 61 (Fig. 2) to their normal positions when permitted to do so by the movement of a cam 225 (Fig. 10) which will be hereinafter explained.

It will be seen from the foregoing description that the rotor is rotated intermittently and it is necessary for the recessed tables 26 (Figs. 1 and 2) to be moved at a predetermined point in each rotation of the rotor and remain in that position throughout the greater portion of each revolution. This is effected partly by means of a rotatable cam 94 (Fig. 2) which is arranged to force the plunger rod 71 inwardly and thus force the plunger rod 71b outwardly carrying with it the table 26 to which the pattern plate 25 is secured.

The peripheral edge of the plunger rod 71 is slotted at 71a (Figs. 2, 11 and 12) in order that it may be engaged by a fixed cam 94a that is illustrated at Figs. 11 and 12 and which is fastened to the inner edge of the standard 22 by screws that engage in screw threaded holes 95 (Fig. 11). It will be seen by referring to Fig. 11 that this cam 94a is a gapped metal ring having a flange 96 which extends throughout the whole length of the gapped metal ring and beyond one end, the extended portion 97 being bent similarly to a railway switch.

At the extreme end of the extended portion 97 and in the same plane therewith is a spring controlled catch 98 (see Figs. 2, 11 and 12) that is slidably secured in a bracket 99 that is bolted or otherwise secured to the inner face of the standard 22 (Fig. 2), so that as the plunger rods 71 (Figs. 1, 2, 11, 12) strike it they will force it back against the action of its spring and come into alignment therewith. At this point the cam 94 projecting inwardly through the aperture 100 (Fig. 2) in the standard 22 will force the plunger rod 71 inwardly causing it to slide longitudinally along the forward edge of the catch 98 (Figs. 11, 12) until the slot 71a is in register with the catch, when the latter will be forced outwardly by its spring 98a and thereby retain the plunger rod 71 (Figs. 11 and 12) against longitudinal movement. As previously stated the catch lies in the same plane with the extremity of the extended end 97 (Figs. 11 and 12) so that when a plunger rod 71 (Figs. 2 and 11) is again moved with the rotor it will move off the catch 98 on to the extension 97 and thus be caused to move outwardly and on to the flange 96. The outward movement of the plunger rod 71 (Fig. 2) will cause the table 26 to be forced outwardly by its plunger rod 71b for the purpose of re-positioning the pattern plate before it and the relative recess 24 again reaches position I (Fig. 1). The arrangement and means for driving the cam 94 (Fig. 2) will be referred to again hereinafter.

The respective vibrators 29 (Fig. 2) must be actuated each time that a mold box (38 or 39) stops at position IV and as the pattern plate 25 is being lifted by its table 26 off the mold 73 (Figs. 1 and 2) for the purpose of assisting the separation of the pattern from the mold. For this purpose there are four vibrators 29 and each vibrator is connected by a flexible pipe 29a to the movable member of the make and break device. It might here be mentioned that in respect of each recess 24 there are two jolting rods 75 that are operated by air pressure as the molding material is being filled into each mold box 38 (or 39) and make and break devices 76a (Fig. 2) similar to those just referred to will be employed for making the necessary connection to the air supply after each mold box has become stationary at position II.

At Fig. 2 of the drawings the position of two of the special make and break air supply connecting devices are shown, in one case (76) the air connection being made for operating a vibrator and the other (76a) for operating the jolting device and the construction of these connecting devices is illustrated at Fig. 13. According to the construction shown the air supply pipe 77 is connected to any source of air supply under pressure and near the exterior side of the standard 22 (Fig. 2) is provided with a valve 102 (Figs. 2 and 13) which will be opened and closed at predetermined intervals by a cam in a manner that will be hereinafter described. Adjacent to its outlet end the pipe 77 will be provided with radial lugs 78 or the like to enable it to be secured by screws to the standard 22, the outlet end being of a bulbous shape. The standard 22 (Fig. 2) will be provided with a hole 79 (Fig. 13) to enable the bulbous end 79a to be passed through and be positioned preferably axially within a cylindrical housing 80 that is provided with an exterior flange 81 at one end to enable the housing to be secured by bolts 82 to the inner face of the standard 22. At the other end of the housing 80 are two oppositely positioned radial lugs 83 that project outwardly for a suitable distance the faces near their outer ends being suitably bevelled at 84. The housing 80 is also provided with an internal flange 85 adjacent to the lugs 83 for the purpose of retaining a rubber plug or filling 86 in position. This plug is provided with a central passage 87 of a diameter that will permit the bulbous end 79a of the air supply pipe to be forced into the plug and make a tight fit therein. In axial alignment with the passage 87 is another passage 87a of smaller diameter and extending to the outer face of the rubber plug 86 which is flush with the outermost faces of the lugs 83 and internal flange 85. The cylindrical housing 80 forms the fixed member of the make and break device, the movable and coacting part being movable by and with the rotor and is secured at any suitable position on the end 88 of the rotor. The movable member just referred to consists of a cylindrical housing 89 having an internal flange 90 at the outer end and an external flange or lugs 91 at the other end to enable it to be secured to the end 88 of the rotor by bolts 92. Secured within the housing 89 is a nozzle 128 the forward end of which is domed and projects through the opening in the internal flange 90 in the housing 89. The body part of the nozzle 128 is cylindrical and is provided with a flange 130 which lies within the housing adjacent to the internal flange 90 the cylindrical portion projecting through a hole 131 in the end of the rotor and is surrounded by a coil spring 132 which is normally held in partial compression between the flange 130 and the end of the rotor. The rear end of the cylindrical portion of the nozzle is extended, the extension being of a smaller diameter and having a bulbous end 133 which is forced into the end of a flexible pipe either 29a (Fig. 2) or 74 according to whether the pipe is connected to a vibrator 29 or to a pneumatic cylinder.

In the movement of the rotor from position II to position III (Fig. 8) the mold boxes 38 (or 39) will be filled with the molding material which at this stage is only compressed around the inner edges by the tucking frame 61 and jolted and the material lying within this compressed surround and near the top will be loose. This loose material might fall out of the boxes as they are moved towards position III and for that reason it is necessary to submit the material to a preliminary squeeze in order to partially compress it and thus ensure that it will remain in its box when it is brought to position III for the mold board to be applied and the molding material to be fully compressed by pressure applied to the mold board 116 in a manner that will be hereinafter explained. The appliances provided for applying this preliminary squeeze are illustrated at Figs. 1, 7 and 8. These consist of a curved metal plate 103 each end of which is provided with a flange 104 (Fig. 1) and at one end of each flange is a hole 105 to enable the plate to be hingedly connected to a lug or the like on any convenient fixture such as the curved angle irons 151. The opposite longitudinal edge 103a of the plate 103 is bent towards the flanges to prevent it fouling the edges of the recesses 24 as the rotor rotates, the plate being supported by but limitedly movable upon its hinge by means of bar 106 provided with a lug 107 (Figs. 1, 7 and 8) at each end to enable it to be securely fastened to the respective standards 22 and 22a. The bar 106 is provided with a central hole through which a bolt 108 may freely pass and slide, the screw threaded end of the bolt engaging with a screw threaded hole in a suitably positioned boss 109 on the convex surface of plate 103. The bolt 108 passes through a coil spring 110 which is held in partial compression between the underside of the bar 106 and the boss 109. A rod 111 (Fig. 3) is pivotally secured at 112 to the respective flanges 104 each projecting end of the rod having fixed thereto one end of an arm 113 and between the other ends of these arms is a roller 114 which is rotatably secured between the arms. The roller 114 is axially parallel with the rotor and is maintained in contact with or pressed towards the rotor by springs 115. In this manner as each mold box approaches the roller 114 (Fig. 1) in its movement from position II to position III the roller 114 will be caused to rise as it strikes the edge of a mold box and having passed over that edge will be depressed by its spring 115 (Fig. 3) on to the surface of the molding material within the mold box and will roll over the loosely packed surface of such material partly compress it. When the opposite edge of the box strikes the roller the latter will be forced to rise against the action of its springs to permit the edge to pass it and the roller will again be moved to its normal position by the springs 115.

It will be seen that the suction on the mold board 116 (Fig. 7) may not at all times be sufficient to keep it in place as a mold box 38 (or 39) (Fig. 2) is being moved from position III (Fig. 1) to position IV. For the purpose of ensuring that the mold board shall remain in position in its mold box during that movement an arcuately curved plate 117 (Fig. 7) is positioned in close proximity to the periphery of the rotor but not in frictional contact therewith and is provided with lugs 118 (Fig. 1) on its outer or convex face, each lug having a short slot 119 each of which engage a pin 120 fixed to and projecting from a face of a bracket 121 or the like that is secured to any convenient fixture between the standards 22 (Fig. 2) and 22a. The bracket 121 (Fig. 1) is provided with lugs 122 in each of which is a hole through which a bolt 123 may freely pass and engage with a screw threaded hole in a boss 124 formed upon the convex side of the plate 117 the bolt passing through a coil spring 125 that is held in partial compression between a lug 122 and a boss 124. In this manner the position of the plate 117 is adjustable within limits by a nut 126 on the bolt 123 and may move outwardly to the limit permitted by the slots 119 against the action of the springs 125. The upper horizontal edge 117a of the plate 117 is bevelled to prevent it fouling the mold box as the latter approaches it. The functioning of the plate 117 will be readily understood by referring to Fig. 8. Attention may here be called to the arrangement of the receiving table 171 (Figs. 1 and 2) which is employed for taking delivery of each mold box 38 or 39 when it is released at position IV and to lower it onto a pair of conveyor belts 172 (Figs. 1, 2 and 20). The upward movement of the table 171 (Figs. 1 and 2) will be timed to take place so that it will be in position when the mold box begins to pass the lower edge of the plate 117 (Fig. 1).

Reference will now be made to the mold board hopper and mechanism for feeding the mold boards into position and applying pressure to each one after it has been positioned and a mold box 38 or 39 has been moved to and become stationary at position III. The various parts of this mechanism are shown at Figs. 1, 3, 4, 7, 8 and 9 of the accompanying drawings. To ensure an even pressure upon each mold board 116 (Figs. 7 and 8) two cams 135 (Figs. 1 and 9) are employed each of which exert pressure upon a presser head 136 (Figs. 1, 4 and 8) which is a rectangular box like structure that is open at the rear end and closed at the other. Two opposite sides at the rear end are each provided with a flange 137 (Figs. 4, 7 and 9) and an inwardly projecting lug or boss 138 (Figs. 4 and 9) adjacent to each flange. This presser head 136 is arranged to slide horizontally in a box like housing 139 (Figs. 3 and 9) that is open at both ends, two opposite sides being cut away from the rear end and inwardly to form slots 140 through which the respective flanges 137 may project and slide back and forth. The slots 140 are each closed at their outer ends by a bridging bar 141 (Figs. 3, 7 and 9) the ends of which may be secured to the edges of the other two opposite sides by screws 142 (Fig. 9). These bridging bars 141 form stops to limit the movement imparted to the presser head 136 (Figs. 1 and 4) by the springs 143 (Figs. 7 and 9) which return the presser head to its normal position when permitted to do so by the movement of the cams 135. The housing 139 (Figs. 3 and 9) is rigidly secured between the standards 22 and 22a (Fig. 2) by means of suitable brackets 144 (Fig. 9) one end of each of which is rigidly secured by bolts or other suitable means to the respective standards 22 and 22a (Fig. 2) the other or inner ends of each bracket being rigidly secured at 144a (Fig. 9) to the top of the housing 139. Each lug 138 is provided with a screw threaded hole to engage with a screw threaded bolt like member 145 each of which is provided with a suitably shaped and dimensioned head 145a that engages with the respective cams 135 (Figs. 3, 4, 9). The screw threaded bolts 145 (Figs. 1 and 4) provide a means for adjusting the distance the presser head is to be moved by the cams 135 and the nuts 146 are for locking the bolt in position when it has been adjusted.

By reference to Fig. 3 it will be seen that the presser head 136 is positioned in central alignment with the mold box 38 (or 39) when either of them are stationary at position III and that the shape and dimensions of the forward end of the presser head 136 is such that it will be smaller than the mold board. The mold boards too must be fed into position before the mold box becomes stationary with the recessed side (or rear face) facing outwardly from the rotor. The mold boards are therefore fed into a recess 147 (Fig. 3) at the forward end of the housing 139 the bottom horizontal side of which is extended to form the floor of the recess and upon which each mold board will rest as it is fed in and in order to hold them in position during the interval between being fed into the recess and being ejected by the presser head 136 (Fig. 4). The end of each mold board is channeled 148 (Figs. 1 and 9) longitudinally and centrally at each end and each side of the recess 147 is provided with a spring actuated ball 149 (Fig. 4) of known construction arranged and positioned to engage with the shallow channel 148 (Figs. 1 and 9) and thus temporarily hold the mold board until it is moved by the presser head 136 when the ball 149 (Fig. 4) will be forced back against the action of its spring, and pass transversely out of the channel 148 (Figs. 1 and 9).

The means employed for feeding the mold boards into position consist of a hopper 150 (Figs. 1 and 9) in which the mold boards 116 are stacked, manually or otherwise, with the recessed side down. It is supported in an elevated position by and between the vertical faces at the upper end of two curved angle irons 151, which project upwardly and outwardly from the rotor. At Fig. 9 it will be seen that a horizontal portion at the upper end of one member of each angle iron 151 is cut away at 151a in order that the other member may lie longitudinally below and be welded or otherwise rigidly secured to and at the bottom of the respective sides 150a of the hopper 150. The hopper is thus supported so that its bottom edges are positioned sufficiently above the uppermost face of a curved plate 152 the lower end of which rests upon the upper side of the presser head housing 139 and is rigidly secured thereto flush with the forward edge thereof. This curved plate 152 is of a width such that the mold board 116 when positioned thereon will project beyond each side thereof and between the vertical inner side faces at the top of the angle iron 151. The curved plate 152 is further supported and strengthened by stiffening plates 153 that are welded or otherwise secured thereto at each side edge and on the concave side thereof. The spaces between the sides of the plate 152 and the inner faces of the vertical or side members of the respective angle irons 151 are for the purpose of forming passages through which the respective hooklike fingers 154 may pass as they remove the bottom mold board 116 from the stack in the hopper 150 and cause it to slide down the convex face of plate 152 as each one is fed into the recess 147 (Fig. 3). As each mold is removed from the stack another one drops into place so that upon their return movement the fingers 154 will strike the bottom mold board; it is, therefore, necessary to arrange the fingers so that their radius may be automatically shortened to enable them to slide across the under side of the mold board each time they return to their normal positions in readiness for the next feeding movement. In the construction shown at Figs. 1 and 9 a crank lever is pivotally secured at 155 to the outer face of each stiffening plate 153, one arm 156 of such crank lever being suitably enlarged to enable a finger 154 to be pivotally secured thereto at 157 and maintained in a normal position by a plate spring 158 and a stop 159, the spring being secured to the arm 156 by a screw 160 (Fig. 1). In this position the finger is in contact with the rearmost longitudinal edge of the bottom plate in the hopper 150. Movement is imparted to the crank lever 156—163 by pins 162 secured to and projecting from a side of each of the respective cams 135 such pins engaging with the other ends 163 of the respective crank levers. The two extreme positions of the crank levers 156—163 are shown by full and dotted lines at Fig. 1. In the position shown by dotted lines the pin 162 is about to disengage the arm 163 when the spring 161 will return the crank lever 156—163 to its normal position. Shock absorbing stops are provided to limit the return movement of the crank levers 156—163. These consist of bracket arms 164 (Fig. 9) one end of each of which is rigidly secured to the inner face of a stiffening plate 153 the other end projecting rearwardly and having its extremity bent outwardly to form a lug 165. The bracket arms 164 form a support for a transverse buffer bar 166 the ends of which extend beyond the respective bracket arms, the projecting ends being slotted longitudinally to form housings wherein rubber buffers 167 may be secured. The ends of the springs 161 are respectively connected to the arm 156 of a crank lever and to a lug 165. The buffer bar 166 is preferably adjustable and for that purpose may be provided with transverse slots 168 wherein the respective bracket arms may lie, a central portion of the underside being cut away at 166a to form lugs 169 in each of which is a hole to enable the bar 166 to be secured by suitable screws 170 at any point to which it is slidably adjusted.

Referring now to the driving mechanism (Figs. 2, 3, 5 and 10), one end of the rotor shaft 20 is extended and the extended end is rotatably supported in a bearing in the standard 22b (Figs. 2, 3, 5). The shaft 20 is driven preferably by a worm gear from any convenient source of power not shown in the drawings. The worm wheel 180 that is driven by the worm 181 (Fig. 10 only) is keyed to a shaft 182 (Figs. 3, 5, 10) that is mounted in bearings formed in or secured to the respective standards 22a and 22b (Fig. 2). The shaft 182 is provided with a suitable clutch 183 (Figs. 2, 3, 5 and 10) whereby the machine may be disengaged from the drive at any desired point by a clutch lever 184 (Figs. 3 and 5) that is pivotally secured at 185 and extended to a point where it may be manipulated by the operator. One member of clutch 183 (Figs. 2, 5) is fixed to a pinion 186 (Figs. 2, 3, 5, 10) which meshes with a gear wheel 187 (Fig. 10) that is keyed to a shaft 188 which is supported in bearings formed in or carried by the respective standards 22a and 22b (Figs. 2 and 3). A pinion 189 (Fig. 10) is also keyed on the shaft 188 and is arranged to mesh with a gear wheel 190 that is keyed to a shaft 191 the ends of which are mounted in bearings formed in or carried by the standards 22a and 22b (Figs. 2 and 3) respectively. On the shaft 191 is keyed a segmental gear wheel 192 that is arranged to intermittently engage with a gear wheel 193 keyed to the extension of the rotor shaft 20 referred to previously. The shaft 20 is provided with a sprocket wheel 194 by which motion is transmitted through the chain 195, sprocket wheel 196 (Figs. 1 and 2), gear wheel 197, pinion 198 and conveyor sprocket wheels 199 to the conveyor belts 172. The sprocket wheel 196 and gear wheel 197 are fixed to a shaft 200 that is supported in bearings formed in or carried by the standards 22a and 22b.

Figure 6:
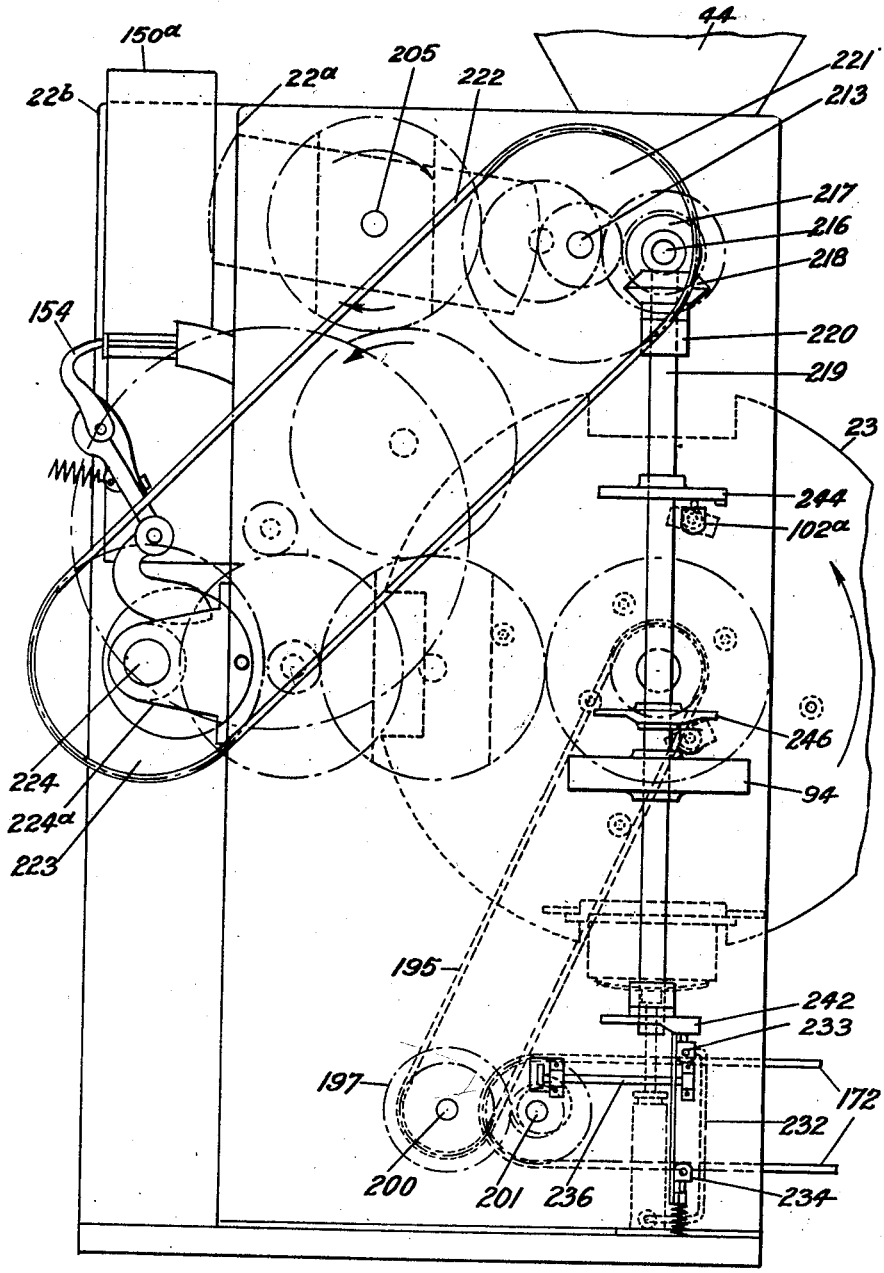
Figure 6 is a side elevation viewed from the direction indicated by arrow E Figure 3.

The pinion 198 and conveyor sprocket wheels 199 are fixed to a shaft 201 that is supported in bearings formed in or carried by the standards 22 and 22a. From the gear wheel 190 (Figs. 2, 3, 5 and 10) power is transmitted for driving the molding material feed drum, the presser head, mold board feed mechanism and the vertical shaft and cams that operate air supply to the receiving table 171 (Figs. 1 and 2) vibrators 29, pneumatic jolting device 75 and hydraulically operated pattern lifting tables 26. For these purposes an idler gear wheel 202, meshing with the gear wheel 190, is fixed to a shaft 203 that is carried by bearings formed in or carried by the respective standards 22, 22a and 22b (Figs. 2 and 3). The gear wheel 202 meshes with another gear wheel 204 which is keyed to a shaft 205 (Fig. 10) that is mounted in bearings formed in or carried by the standards 22, 22a and 22b (Figs. 2 and 3). Keyed to the shaft 205 (Figs. 2, 3, 5 and 10) is a segmental gear wheel 206 that is arranged to mesh with an idler gear wheel 207 (Figs. 2, 5 and 10) that is fixed to a shaft 208 (Figs. 5 and 10) that is supported in bearings formed in or carried by the respective standards 22a and 22b (Figs. 2 and 3). The gear wheel 207 (Figs. 5, 10) meshes with a gear wheel 209 (Figs. 2, 5, and 10) which is fixed to the measuring drum shaft 210 that is mounted in bearings formed in or carried by the standard 22 and 22a (Figs. 2 and 3). By reference to Fig. 2 it will be seen that one end of the shaft 210 is keyed or otherwise secured to the measuring drum which, as previously explained, is supported by brackets 53. Upon the shaft 205 (Figs. 2, 3, 5 and 10) is keyed a segmental gear wheel 211 (Figs. 2 and 10) which meshes with a gear wheel 212 (Fig. 10) that is keyed to a shaft 213, which is supported on a bracket bearing 214 (see Fig. 3). The gear wheel 212 also meshes with a gear wheel 215 that is fixed to a shaft 216 (Fig. 10) that is also mounted in the bracket bearing 214 (Figs. 2, 3). The shaft 216 (Figs. 2, 3, 6 and 10) has a mitre gear wheel 217 fixed thereto and which meshes with a similar wheel 218 fixed to the upper end of a vertical cam shaft 219 that is supported by bracket bearings 220 (Figs. 2 and 6) that are fixed to the outer face of the standard 22 (Fig. 2). Fixed to the shaft 213 (Figs. 2, 3, 6 and 10) is a sprocket wheel 221 that is connected by a sprocket chain 222 to another sprocket wheel 223 (Figs. 2, 3, and 6) that is fixed to and drives the cam shaft 224 (Figs. 3 and 6) whereon the cams 135 (Figs. 3, 4 and 9) are mounted for the purpose of operating the presser head 136 (Figs. 3 and 9). The cams shaft 224 (Figs. 3, 4, 6 and 9) is secured in bracket bearings 224a (Figures 3, 4, 6) fixed to the respective standards 22 and 22a (Figs. 2, 3, 4). On the shaft 203 is a cam 225 (Figs. 5 and 10) which as it rotates with its shaft strikes the push rod 67 (Figs. 2 and 5) in order to depress the tucking frame 61 (Figs. 1 and 2) as previously explained the return movement of the frame being caused by the spring 70 (Fig. 5).

In order to ensure that the rotor will be properly positioned at each point at which it becomes stationary the shaft 20 (Figs. 1, 2 and 10) has fixed thereto a ratchet wheel 226 (Figs. 2, 3 and 5) integral with which is another ratchet wheel 227. The ratchet wheel 226 is engaged by a pawl 228 (see Figs. 2 and 5) that is pivotally secured to the standard 22b and which is maintained in contact with the ratchet wheel 226 by a spring 229. The ratchet wheel is provided with teeth adapted to be engaged by the push rod 230 which is actuated by a cam 231 that is fixed to the shaft 205 (Figs. 2, 3, and 5).

The push rod 230 is slidably secured in brackets 230a (Figs. 2 and 5) fixed to the standard 22b and is provided with a fixed collar 230b (Fig. 2) and a coil spring 230c (Figs. 2 and 5) that surrounds it, is held in partial compression between the collar 230b and the lower bracket 230a (Fig. 2) in order to maintain the push rod 230 in contact with the cam 231 (Figs. 2 and 5). The rotor may when driven by its shaft 20 move beyond its proper position and the cam 231 is therefore arranged to force the push rod 230 down four times in each revolution of the rotor shaft 20 to a predetermined point where its lower end will engage sequentially with each of the four teeth on the ratchet wheel 227 and if the rotor has moved beyond its proper positions the cam 231 will cause the push rod 230 to move the ratchet wheel 227, the shaft 20 and rotor backwardly until the latter is properly positioned, when the pawl 227 will be in engagement with a tooth in the ratchet wheel 226.

Whilst it has hereinbefore been stated that this machine is designed for the purpose of making from one to four molds in each revolution of the rotor it should be understood that nothing is to be gained by making two or three molds in each revolution of the rotor but it may be advisable to make only one mold in each revolution, as for instance in the case of a comparatively large mold because the jolting at position II may displace the molding material at positions III and IV. To make 1, 2, or 3 molds in each revolution it will only be necessary to rearrange the timing of the mechanism for driving the measuring drum 48 in order that the molding material will be delivered only at those stoppages of the rotor when a mold box is at position II. The mold boards 116 will of course be delivered and forced into the recesses 24 by the presser head 136 each time a recess 24 becomes stationary at position III but if any of those recesses do not contain a mold box with the molding material therein there will be no resistance to the presser head and the mold board will remain in the recess and will be prevented from falling out by the arcuately curved plate 117 in a manner already described until it is delivered on to the receiving table 171 by which it will be lowered on to the conveyor belts in a manner previously explained.

It has already been explained that the receiving table 171 (Figs. 1, 2 and 20) below the rotor must be in a position to receive a mold box 38 (or 39) with the mold 73 (Figs. 1 and 2) and mold board 116 therein as they emerge from the lower end of the curved plate 117 and it must remain in the raised position for a sufficient period to permit the respective vibrator to vibrate the pattern plate 25 as the latter is being raised from the mold. The means for controlling the air supply through the pipe 232 (Figs. 2 and 20) to the pneumatic cylinder 247 that actuates the receiving table 171 are the cams 239 and 242 but it will be seen that the respective shafts 201 and 219 (Figs. 2 and 6) by which these cams are carried are driven intermittently through the segmental gear wheels 192 and 211 (Fig. 20) respectively and as the cock 233 (Figs. 2 and 20) could not be kept open for a sufficient period, supplementary means are provided to maintain the air pressure for the balance of the time. These means are illustrated at Figs. 2 and 20 by referring to which it will be seen the main air supply pipe 232 is provided with a spring actuated cock 233 and an exhaust branch pipe 232a which is also provided with a spring actuated cock 234. The cocks are such that their respective springs normally hold them in the closed position. They are reversely positioned on their respective pipes and in vertical alignment with one another in order that one may be closed and the other opened or vice versa. A radial arm 235 (Fig. 20) is fixed to a horizontal shaft 236 that is secured in bracket bearings 237 or the like that are fixed to the standard 22. Fixed to the shaft 236 is another radial arm 238 the outer end of which passes through an aperture 238a in the standard 22 and is suitably shaped to engage with a cam 239 which is fixed at a suitable position on the shaft 201. Below the radial arm 235 is a bracket bearing 240 to which is pivotally secured another radial arm 241 the bearing of which is positioned so that both the radial arms 235 and 241 may move in the same vertical plane and parallel with one another.

The radial arm 235 is also located immediately above the spindle of the cock 233 and the radial arm 241 is located immediately below the spindle of the cock 234, in such a manner that the radial arms 235 and 241 are parallel with one another whilst one of the air cocks 233 or 234 is open and the other closed or vice versa. In this position the outer ends of the radial arms 235 and 241 are pivotally connected to a vertical rod 243 the upper end of which extends upwardly to a point where it will be held in the position depressed by the cam 242 sufficiently to simultaneously hold the radial arms 235 and 241 so that the former will open the cock 233 and the arm 241 permit the cock 234 to close. As the cocks 233 and 234 are reversely positioned their respective springs would neutralise the pressure that is exerted individually upon the respective radial arms 234 and 241 and for this reason a compression spring 244a is interposed between the lower end of the vertical rod 243 and any convenient fixture below it such as the foot of the standard 22 in order that the rod 243 will when permitted to do so by the cam 239 and radial arm 238 be raised to a position where it may be actuated by the cam 242 during part of each intermittent revolution with its shaft 219.

The operation of the devices just described for controlling the air supply to the ram 247 will be explained later.

It has been previously explained how the vibrators 29 (Fig. 2) and pneumatic cylinders that actuate the jolting rods 75 are supplied with air as each mold box reaches the positions IV and II respectively and that the air supply pipe 77 to those devices is provided with a cock 102 (Fig. 13). These cocks 102 (Fig. 2) are arranged to be opened when the rotor stops and the coacting parts of the respective make and break devices are in engagement with one another. The cocks 102 and 102a are of known type that are provided with a spring actuated spindle and which are automatically closed by a spring and are opened by depressing the spindle. The cock 102a (Fig. 2) controlling the air supply for actuating the jolting rods 75 is opened and closed as often as required when the rotor stops after each arcuate movement by a face cam 244 which is provided with relatively deep corrugations 245 the concave portions of which permit the valve to automatically close whilst the convexities cause it to open. It will of course be understood that the pneumatic jolting device will have to be provided with an appropriate exhaust but as previously stated jolting machines are known and are provided with an exhaust which is opened at the end of each forward stroke. A cam 244 is keyed or otherwise fixed to the vertical shaft 219 as shown at Fig. 2. The cock 102 which controls the air supply to the vibrators 29 is opened, when the rotor stops after each arcuate movement, by a cam 246 which is fixed at a suitable point on the vertical shaft 219 and is shaped so as to open the cock 102 and keep it open for the required period in each revolution of the shaft.

The cycle of operations of the air supply valve 233 controlling the mold box receiving tables 171, is as follows:

It will be assumed that the complete half mold has just arrived at the position IV (Fig. 1). The mold box receiving table 171 (Figs. 2 and 20) is then in the fully raised position, the air supply is on and is held on by the cam 242 and the cam 239 on the conveyor shaft 201 is not actuating the radial arm 238.

The vibrator now starts to operate and the pattern plate lifting table 26 begins to rise.

The cam 242 during this period has kept the air supply valve 233 open to maintain the mold box receiver table 171 in the raised position.

The cam 242 at approximately ⅔ of its cycle allows the air supply valve 233 to close and the exhaust valve 234 to open so as to permit the box receiving table 171 to lower the mold box 38 and contents on to the conveyor belts 172.

The cam 239 is also in a position in which the air supply is cut off.

The rotor now commences to revolve and the air supply to the pneumatic cylinder 247 is turned on by the cam 239 at about one third (⅓) of the rotor's ¼ cycle, thereby causing the receiving table to rise to the receiving position in readiness for the oncoming mold.

The cam 239 continues to hold open the air supply valve 233 to approximately ⅞ of the rotor's quarter cycle when the cam 242 will move into position and take over the holding open of the air supply valve 233 while the rotor moves the last fraction of its ¼ cycle in which position the cam 239 will not be actuating the radial arm 238 because the cam 242 takes over the holding open of the air supply valve 233 which cam 242 commences its cycle just before the rotor has completed its quarter cycle.

The purpose of over lapping the cam 242 movement and cam 239 movement, is for the sole purpose of transferring the control of the air supply valve from one cam to another.

The various functions performed in relation to the formation of one half mold as it is carried by the rotor from position I sequentially to positions II, III and IV will now be explained but it must be remembered that one or more mold boxes are following the particular one whose movements are being traced and the same functions are being repeated at the positions from which it has last been moved.

It will be assumed that the rotor is stationary, that the recesses 24 (Figs. 1 and 2) are properly positioned and a pattern plate 25 has been secured to a lifting table 26 at position I. A mold box 38 will now be manually placed in the recess at position I so that the catches 35 engage with the respective handles 37 and thus hold the mold box 38 (or 39) securely in position. The rotor will now be rotated by the driving gear through an arc of 90° to position II the push rod 230 being moved by the cam 231 into engagement with the ratchet wheel 227 to ensure the proper positioning of the rotor. During this movement of the rotor the shaft 210 (Figs. 5 and 10) has rotated the measuring drum 48 bringing a chamber 55 (Fig. 1) filled with the molding material adjacent to the discharge aperture 59 so that as the rotor stops, the molding material will be discharged into the positioned mold box below. The coacting members of the make and break device came into alignment with one another simultaneously with the stoppage of the rotor and the cam 244 had been rotated into a position in readiness to open the valve 102a and which it will open simultaneously with the movement of the push rod 67 by the cam 225, in order to actuate the relative jolting rods 75 and to force the tucking frame 61 partly into the loose molding material to ensure that the material within the mold box adjacent to the walls thereof will be more tightly packed than the body of the material.

Prior to the movement of the rotor for the insertion of the mold box now being referred to, at position I, one of the cams 34 (Figs. 2, 18 and 19) engaged the adjacent ends of the locking bars 33 and moved them longitudinally so as to cause them to move inwardly towards one another upon their respective pins 30a thereby locking the pattern plate 25 in position. Prior also to the arrival of the recess at position I for the insertion of a mold box the slotted piston rod 71 Fig. 2 has been engaged by the part 97 Fig. 11 of the cam 94a, pulling it outwardly from its hydraulic cylinder in order to force the plunger rod 71b, the table 26 and pattern plate secured thereto into position at the bottom of a recess where it will be held throughout the major portion of one revolution of the rotor (see Figs. 1 and 12).

The molding material having been delivered into, tucked and jolted, the rotor will be moved through an arc of 90° to bring the mold box and molding material therein to position III and in making this movement the mold box 38 (or 39) will pass inside the spring controlled roller 114 (Figs. 1 and 7) to receive the preliminary compression. Upon arrival at position III (Fig. 1) a mold board 116 will have been positioned in the recess 147 where it is lightly held by the spring actuated balls 149 (Fig. 8) the presser head 136 having been forced outwardly by the springs 143 (Figs. 3 and 9). At this point the cam 135 (Fig. 1) on the cam shaft 224 will engage the head 145a and force the presser head 136 forwardly carrying with it the mold board 116 that was lightly held in the recess 147, forcing it into the mold box and thereby compressing the molding material therein. The continued movement of the cams 135 will release the presser head 136 so that the springs 143 may force it rearwardly in order that the rotor will be free to be driven through the next arcuate movement of 90° in order to bring the mold box 38 (or 39) with the mold 73 and mold board 116 therein to position IV. At the beginning of the movement from position III however the mold board will contact with the bevelled edge 117a that forms a lead on to the concave face of the plate 117 by which the mold board 116 is prevented from falling out of the mold box 38 (or 39).

During the passage of the mold box from position III to position IV, a circular cam 34 (Fig. 2) will move the locking bars 33 (Figs. 18 and 19) longitudinally causing them to slide upon their respective pins 30a outwardly from one another to the unlocked position in order to release the pattern plate 25 (Fig. 2) in readiness for the latter to be raised with its table 26 which, it will be noted, has been held in the position shown at Fig. 2 by the continued engagement of the slots 71a in the plunger rod 71 with the fixed cam 94a (Figs. 2, 11 and 12) but as the mold box approaches position IV it becomes disengaged from that cam in order to permit it to be forced in by the rotating cam 94 on the vertical shaft 219 in order to force the hydraulic plunger rod 71b inwardly and thereby lift the table 26 and the pattern plate 25 attached thereto off the mold. Simultaneously with the stoppage of the rotor with the mold box 38 (or 39) and its contents at position IV the fixed and movable members of the make and break air connections 76 come into register with one another and immediately afterwards the cam 246 opens the air supply cock 102 and the vibrator vibrates the table 26 in order to create an easement and thus assist the pattern plate 25 to separate cleanly from the mold 73.

Simultaneously with or immediately before the stoppage of the rotor at position IV the catch 93 is forced by its spring into engagement with the slot 71a in the plunger rod 71 to ensure that the table 26 will remain in the raised position. When the mold box 38 (or 39) and its contents was approaching position IV too the longitudinally bevelled edges 36a of the fixed cams 36 engaged the pins 35b gradually pulling them and their catches 35 outwardly until at the stoppage of the rotor the catches 35 are disengaged from the respective handles 37 and the mold box 38 (or 39) with its contents will be free to rest upon the waiting table 171.

I claim:

1. A rotary molding machine including a rotor adapted to rotate in arcs of 90° through 360° in a vertical plane and having recesses spaced around its circumferential surface, each recess being adapted to receive a removable pattern plate at the base thereof and a mold box therein carried on said pattern plate, means above the highest point of the rotor for filling the mold box with molding material, means spaced 90° from said mold box filling means for applying a mold board to the outer surface of said molding material, means for preventing spillage of molding material from the mold box during rotation of said rotor through the first arc of 90° after filling, means spaced 180° from said mold box filling means for removing said mold from the rotor, and means for retaining the mold board in fixed position during rotation of the rotor to the mold box removal position.

2. A rotary molding machine including a rotor adapted to rotate in arcs of 90° through 360° in a vertical plane and having recesses spaced around its circumferential surface, each recess being adapted to receive a pattern plate removably secured to a vibratable table in the base thereof, means for vibrating said table, a mold box carried on each pattern plate, means above the highest point of the rotor for filling the mold box with molding material, means spaced 90° from said mold box filling means for applying a mold board to the outer surface of said molding material, means for preventing spillage of molding material from the mold box during rotation of said rotor through the first arc of 90° after filling, means spaced apart 180° from said mold box filling means for removing said mold box from the rotor, and means for retaining the mold board in fixed position and applying pressure thereto during rotation of the rotor to the mold box removal position.

3. A rotary molding machine including a rotor adapted to rotate in arcs of 90° through 360° in a vertical plane and having recesses spaced around its circumferential surface, each recess being adapted to receive a removable pattern plate at the base thereof and a mold box thereon, means above the highest point of the rotor for filling the mold box with molding material, means spaced apart 90° from said mold box filling means for applying a mold board to the outer surface of said molding material, means for preventing spillage of molding material from the mold box during rotation of said rotor through the first arc of 90° after filling comprising a pressure plate adapted to contact and press against the outer surface of the molding material, means spaced 180° from said mold box filling means for removing said mold box from the rotor, and means for retaining the mold board in fixed position and applying pressure thereto during rotation of the rotor to the mold box removal position.

4. A rotary molding machine including a rotor adapted to rotate in arcs of 90° through 360° in a vertical plane and having recesses spaced around its circumferential surface, each recess being adapted to receive a removable pattern plate at the base thereof and a mold box thereon, means above the highest point of the rotor for filling the mold box with molding material, cam actuated means spaced 90° from said mold box filling means for applying under pressure a mold board to the outer surface of said molding material, means for preventing spillage of molding material from the mold box during rotation of said rotor through the first arc of 90° after filling, means spaced 180° from said mold box filling means for removing said mold box from the rotor, and means for retaining the mold board in fixed position and applying pressure thereto during rotation of the rotor to the mold box removal position.

5. A rotary molding machine including a rotor adapted to rotate in arcs of 90° through 360° in a vertical plane and having recesses spaced around its circumferential surface, each recess being adapted to receive a pattern plate removably secured to a vibratable table in the base thereof, a mold box on each pattern plate, means above the highest point of the rotor for filling the mold box with molding material and for tucking the edges thereof, means spaced 90° from said mold box filling means for applying a mold board to the outer surface of said molding material, means for preventing spillage of molding material from the mold box during rotation of said rotor through the first arc of 90° after filling, means spaced apart 180° from said mold box filling means for removing said mold box from the rotor, and means for vibrating said vibratable table during the filling and removing of said mold box, and means for retaining the mold board in fixed position and applying pressure thereto during rotation of the rotator to the mold box removal position.

W. J. WILLIAMS.